(12) United States Patent
Chua et al.

(10) Patent No.: US 9,301,047 B2
(45) Date of Patent: Mar. 29, 2016

(54) LOUDSPEAKER AUDIO ACCESSORY FOR A COMMUNICATION DEVICE

(71) Applicant: MOTOROLA SOLUTIONS, INC, Schaumburg, IL (US)

(72) Inventors: Hong Da Chua, Batu Pahat (MY); Kok Yong Chan, Paya Terubong (MY); Lanting L. Garra, Sunrise, FL (US); Ying Hooi Tan, Jelutong (MY)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 14/472,780

(22) Filed: Aug. 29, 2014

(65) Prior Publication Data

US 2016/0066084 A1    Mar. 3, 2016

(51) Int. Cl.
*H04R 3/00*      (2006.01)
*H04M 1/725*    (2006.01)
*G08B 3/00*      (2006.01)

(52) U.S. Cl.
CPC .. *H04R 3/00* (2013.01); *G08B 3/00* (2013.01); *H04M 1/7253* (2013.01); *H04R 2420/01* (2013.01)

(58) Field of Classification Search
None
See application file for complete search history.

(56) References Cited

U.S. PATENT DOCUMENTS

| | | |
|---|---|---|
| 8,271,037 B2 | 9/2012 | Harmke |
| 8,380,128 B2 | 2/2013 | Higgins |
| 8,380,160 B2 | 2/2013 | Monks et al. |
| 2004/0203570 A1 | 10/2004 | Berger |
| 2006/0264237 A1 | 11/2006 | Rose et al. |
| 2007/0080814 A1* | 4/2007 | Ellsworth ............ G08B 27/008 340/573.1 |
| 2007/0099593 A1 | 5/2007 | Thome et al. |
| 2010/0234051 A1 | 9/2010 | Holden et al. |
| 2012/0135685 A1 | 5/2012 | Higgins |
| 2014/0221039 A1* | 8/2014 | Liao .................... H04M 1/7253 455/550.1 |
| 2014/0242928 A1 | 8/2014 | Kang et al. |

FOREIGN PATENT DOCUMENTS

| | | |
|---|---|---|
| EP | 1223682 B1 | 9/2003 |
| EP | 1855507 A2 | 11/2007 |
| WO | 0125955 A1 | 4/2001 |
| WO | 02093956 A1 | 11/2002 |
| WO | 2009089393 A1 | 7/2009 |

OTHER PUBLICATIONS

U.S. Appl. No. 14/447,718, filed Jul. 31, 2014.

* cited by examiner

*Primary Examiner* — Brenda Bernardi
(74) *Attorney, Agent, or Firm* — Barbara R. Doutre

(57) ABSTRACT

A loudspeaker audio accessory provides and non-cable interface to a portable radio. The accessory can operate in conjunction with the radio or as a standalone device. An accessory loudspeaker is contained within the accessory housing, the accessory loudspeaker being positioned at a tilted angle within the housing to direct audio upwards towards audio porting located on a top surface of the accessory housing. The accessory provides a plurality of operational modes, the first mode of operation being a stand-alone mode generating an emergency alert audio tone via the loudspeaker in response to a switch being enabled; and the second mode of operation provides boosted audio via the accessory loudspeaker when the accessory is coupled to a radio. The accessory can also operate in conjunction with the radio via a short range link to selectively emergency signals and boosted audio.

16 Claims, 4 Drawing Sheets

LOUDSPEAKER AUDIO ACCESSORY FOR A COMMUNICATION DEVICE

FIELD OF THE DISCLOSURE

The present disclosure relates generally to portable communication devices, and more particularly to audio accessories for portable communication devices.

BACKGROUND

Communication devices, such as portable radios, often operate in conjunction with a variety of audio accessory devices. Both the radio and the audio accessory are oftentimes required to be designed within very limited space constraints. Certain acoustic elements tend to be large relative to the amount of space available, for example an electromagnetic loudspeaker requires space for adequate back volume. Some small business type radios have no built-in loudspeaker, and users do not have the option for a loudspeaker. Some small radios do not provide the option to switch between an in-ear accessory and an external loudspeaker. Additionally, radio accessories for smaller radio products are not typically equipped with emergency signals through a loudspeaker.

Unlike a built-in loudspeaker inside a radio, some audio accessories work as a portable external speaker, such as for example a remote speaker microphone (RSM). However, the RSM has limitations due to its cable length. The user may feel their movement is restricted when the cable is not long enough, or the user may feel a longer cable length is a nuisance. Designers are challenged trying to provide a cabled audio accessory that suits users of various physical sizes with one design approach.

Accordingly, there is a need for a loudspeaker accessory that overcomes the aforementioned issues.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
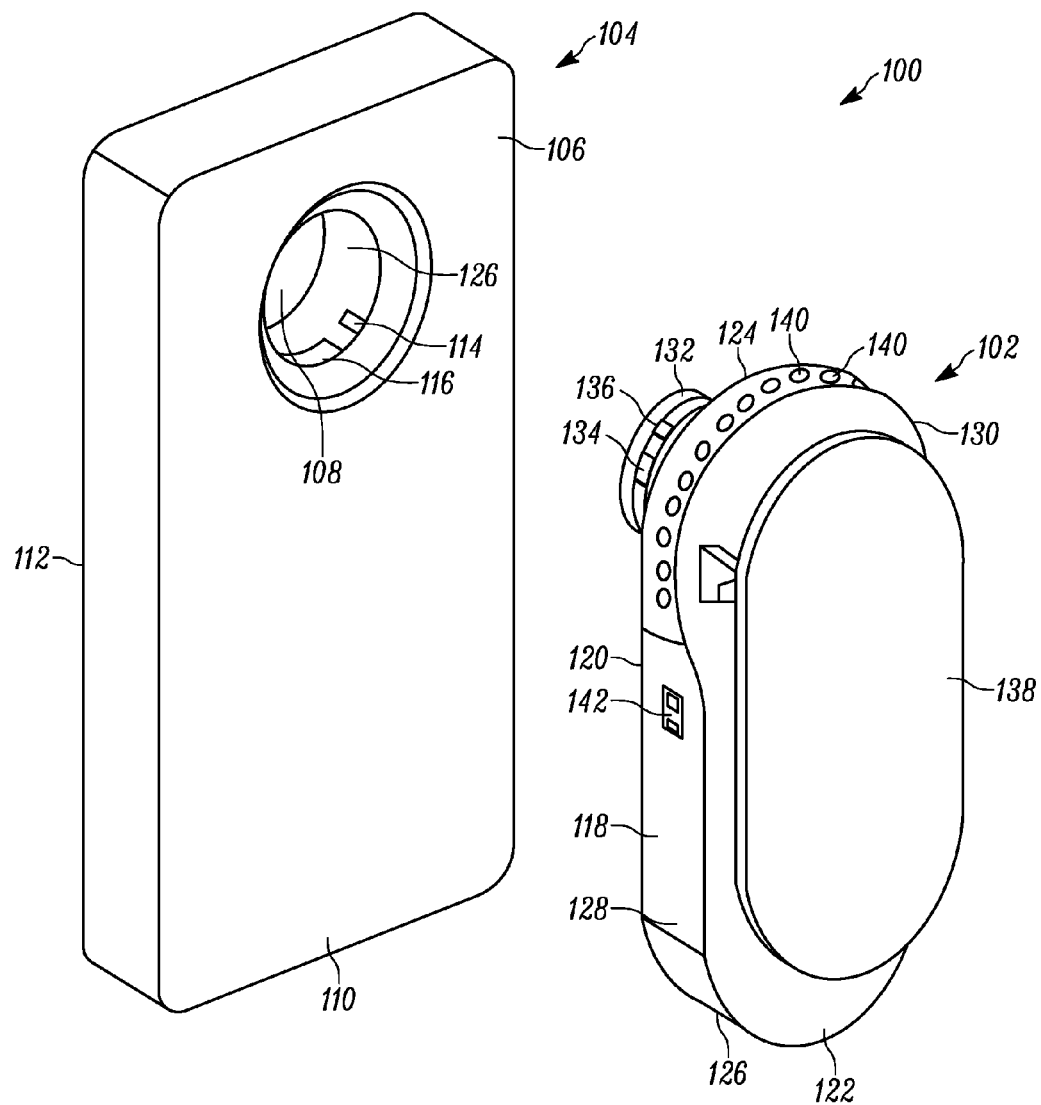
FIG. 1 is a portable communication system comprising a portable radio and non-cabled, loudspeaker audio accessory in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, in accordance with the various embodiments a loudspeaker audio accessory is interfaced to a portable radio without the use of a cable connection between the audio accessory and the radio. The portable radio comprises a radio housing having a through-hole forming an inner circular wall traversing through front and back surfaces. The loudspeaker audio accessory comprises a button that can be latched to and unlatched from the through-hole of the portable radio. The electrical and mechanical interface utilizes a coaxial contact scheme within the through-hole of the portable radio and about the button of the audio accessory. A clip at the loudspeaker audio accessory further allows the portable radio and loudspeaker audio accessory to be carried as a single form factor, such as on a user's belt or shirt epaulette, further taking advantage of the non-cabled interconnect. The loudspeaker within the audio accessory is uniquely arranged to take advantage of limited space. In accordance with the various embodiments, the internal loudspeaker is assembled within the audio accessory in a tilted manner to create a back volume that permits porting the loudspeaker audio through an upward vertical porting arrangement. An emergency switch at the audio accessory is further provided to ensure a loud emergency signal option. The non-cabled, loudspeaker audio accessory can provide boosted audio to a radio already having a regular speaker, can provide loudspeaker function alone, and/or emergency signal generation.

FIG. 1 is a portable communication system 100 comprising a non-cabled, loudspeaker audio accessory 102 and a portable radio 104 in accordance with the various embodiments. Portable radio 104 may be a portable two-way radio or other portable communication device. Portable radio 104 comprises a radio housing 106 having a through-hole 108 formed from a back surface 110 to a front surface 112. Electrical and mechanical interface contacts 114, 116 reside within an interior sidewall 126 of the through-hole 108. Loudspeaker audio accessory 102 comprises an accessory housing 118 formed of front 120, back 122, top 124, bottom 126, first side 128, and second side surfaces 130. A circular button 132 extends from the front surface 120 of the accessory housing 118 for coupling the loudspeaker audio accessory 102 to the portable radio 104. The circular button 132 comprises electrical and mechanical interface features, such as mechanical latch 134 and electrical contacts 136, for coupling to corresponding interconnect contacts 114, 116 on the portable radio 104, without the use of a cable. A clip 138 is mounted to the back surface 122 of the accessory housing 118. Accessory loudspeaker audio porting 140 is located along the top surface 124 of the accessory housing 118 and may further extend down a portion of the first and second side surfaces 128, 130. A switch 142 is located on the accessory housing 118 for enabling and disabling emergency alert signals through either the accessory porting 140, or through both accessory porting 140 and radio porting 302 (shown in FIG. 3) on the front surface 112 of the portable radio 104.

In accordance with the various embodiments, loudspeaker audio accessory 102 provides first and second modes of operation, the first mode of operation being a stand-alone mode generating an emergency alert audio tone via the accessory loudspeaker through top porting 140 in response to the switch 142 being enabled. This mode can be generated whether the accessory is attached to the radio or not. The second mode of operation provides boosted audio via the accessory loudspeaker through accessory top porting 140 in combination with the radio speaker audio when the loudspeaker audio accessory 102 is coupled to the portable radio 104. This second mode of operation can be extended to the emergency switch, which when enabled, can also control emergency tones being generated through both speakers (accessory and radio)—albeit that the loudspeaker of the accessory will be louder than the emergency signal playing out of the radio.

While the loudspeaker audio accessory 102 attaches to the portable radio 104 through the circular button 132 and through-hole 108 interface, the accessory can also be removed and clipped using clip 138 remotely, for example to a user's clothing or nearby object and operate via a short area link in conjunction with the radio to boost audio with the devices separated. The loudspeaker audio accessory 102 comprises an accessory power source, controller, audio circuitry and short range communication capability, such as Bluetooth, to provide remote operation capability when the loudspeaker audio accessory 102 is operating away from the portable radio 104, but within Bluetooth range. Thus, the two speakers (radio speaker and accessory loudspeaker) can still operate to provide boosted audio with the devices apart. The switch 142 may be a multi-position switch that can enable and disable the boosted audio feature as well as enable and disable emergency signals. Alternatively, separate switches for boosted audio and emergency control can be used.

Figure 2:
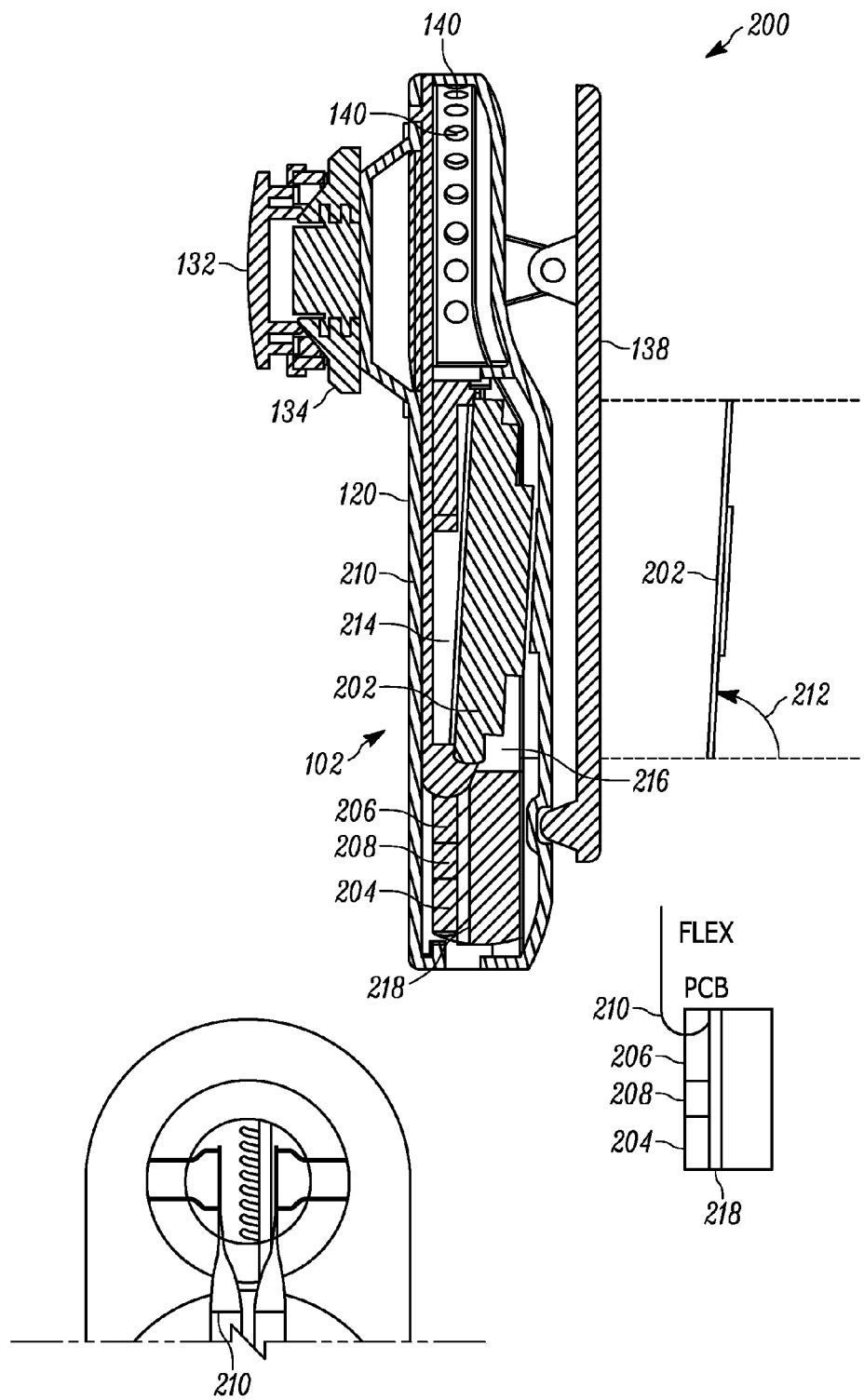
FIG. 2 shows a cut-away view of the loudspeaker incorporated within the audio accessory in accordance with the various embodiments.

FIG. 2 shows a cut-away view 200 of an accessory loudspeaker 202 incorporated within the loudspeaker audio accessory 102 in accordance with the various embodiments. The loudspeaker audio accessory 102 comprises a battery 204, controller and audio circuitry 206, switch 208, interconnect flex 210, and printed circuit board 218. In accordance with the various embodiments, the accessory loudspeaker 202 is positioned at a tilted (non-parallel and non-perpendicular) angle 212 relative to the front surface 120 of the accessory housing 118 so as to direct audio signals upwards towards the accessory audio porting 140 located along the top surface 124 of the accessory housing.

The accessory loudspeaker is positioned at a tilted angle 212 relative to the front surface 120 and accessory audio porting 140 is located along a top surface 124. The loudspeaker audio accessory 102 provides first and second modes of operation, the first mode of operation being a stand-alone mode generating an emergency alert audio tone via the loudspeaker in response to the switch being enabled; and the second mode of operation providing boosted audio via the accessory loudspeaker when the accessory is coupled to a radio. A third mode of operation provides boosted audio or emergency from the accessory loudspeaker when the accessory is separated from the radio but communicating through a short range link.

Again, the loudspeaker audio accessory 102 provides an electro-mechanical, non-cable interface for coupling the loudspeaker audio accessory 102 to the portable radio 104 via a mechanical latch 134 and the electrical contacts 136 along a circumference of the circular button 132. Porting of the audio presents several challenges in terms of space and adequate volume. Likewise the position of the clip 138 further limits the area available for porting. The challenge of porting the loudspeaker audio of the accessory has been addressed by orientating the accessory loudspeaker 202 and a tilted angle 212 upwards towards the top surface 124 of the loudspeaker audio accessory 102 so that the audio can be directed to top porting 140. The tilted angle 212 allows for a front volume space 214 and a back volume space 216 to be formed between the front surface 120 and the back surface 122 of the accessory housing 118. Thus, the accessory loudspeaker 202 has been assembled within limited space constraints with adequate porting to allow the accessory to operate in the various modes described.

Figure 3:
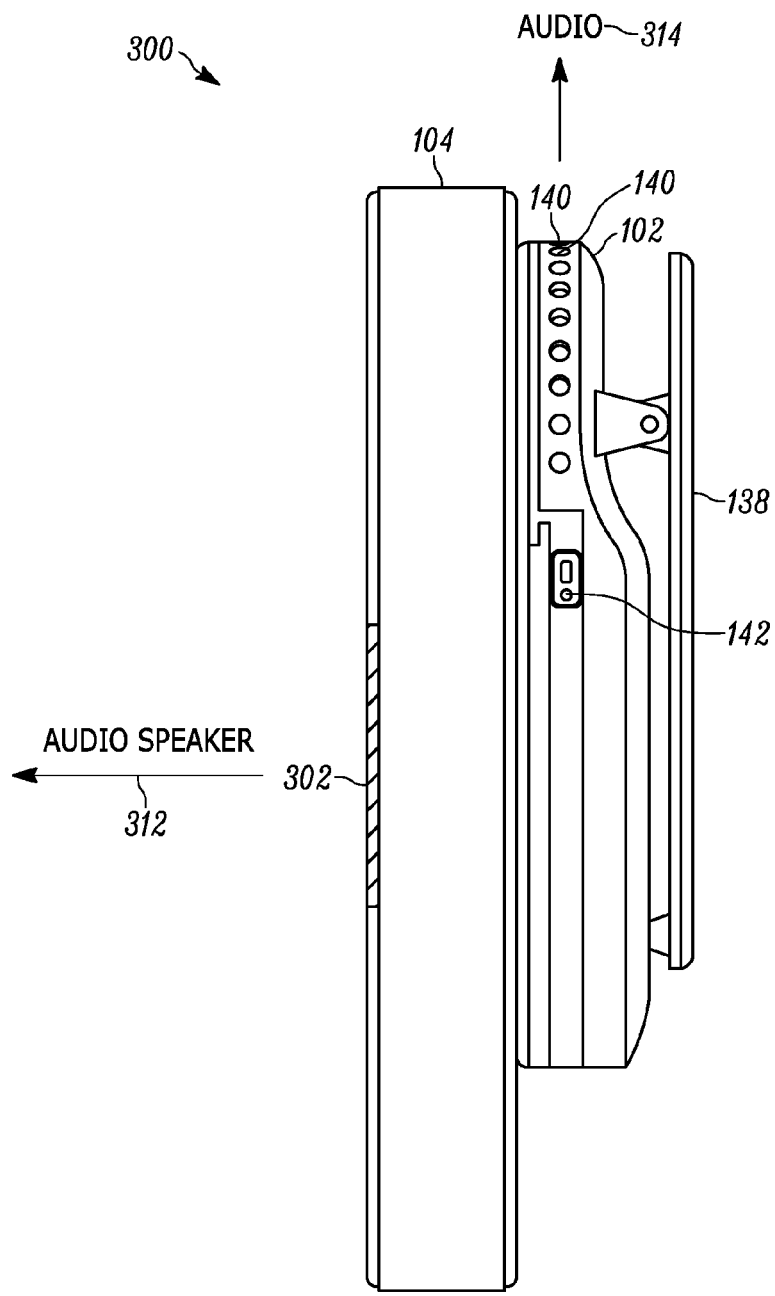
FIG. 3 is a side view of the loudspeaker audio accessory coupled to the radio, the accessory further providing an emergency alert feature in accordance with the various embodiments.

FIG. 3 is a side view 300 of the loudspeaker audio accessory 102 coupled to the portable radio 104 in accordance with the various embodiments. The loudspeaker audio accessory 102 further provides the emergency alert feature via switch 142 in accordance with the various embodiments. In this embodiment, the accessory and radio comprise speakers, with accessory 102 comprising the accessory loudspeaker 202, and the radio comprising a regular speaker with front radio porting 302. Audio signals 312 are ported out of speaker porting 302 while audio signals 314 are ported out of audio porting 140. The radio speaker provides, for example, 80 Phon range of loudness, and the accessory loudspeaker 202 provides 88 Phon range of loudness. Together, the boosted audio can provide 91 Phon range of loudness.

The clip 138 at the loudspeaker audio accessory 102 allows the portable radio and loudspeaker audio accessory to be carried as a single form factor, such as on a belt or shirt epaulette, allowing a user to take full advantage of the non-cabled interconnect. The clip 138 is mounted to the back surface 122 of the accessory housing 118 which as discussed earlier presented a challenge for porting the loudspeaker. The combination of audio porting 140 located at the top 124 and sides of the accessory housing along with the tilting of the speaker within the accessory allows the accessory to provide loudspeaker capability (for tone or audio) with the accessory still attached to the radio.

The clip 138 may also be used to mount the loudspeaker audio accessory 102 remotely from the portable radio 104, and the loudspeaker audio accessory 102 and portable radio 104 may then communicate via a short range link, such as for example Bluetooth, to still provide boosted audio through both speakers. A short range link can also be used to generate an emergency audio signal through both speakers.

Accordingly, the assembly, porting, non-cable interconnect and internal speaker and loudspeaker positioning within the housing all allows for both a single radio/accessory forma factor and separate form factors—operating together for boosted audio and/or emergency tones.

Figure 4:
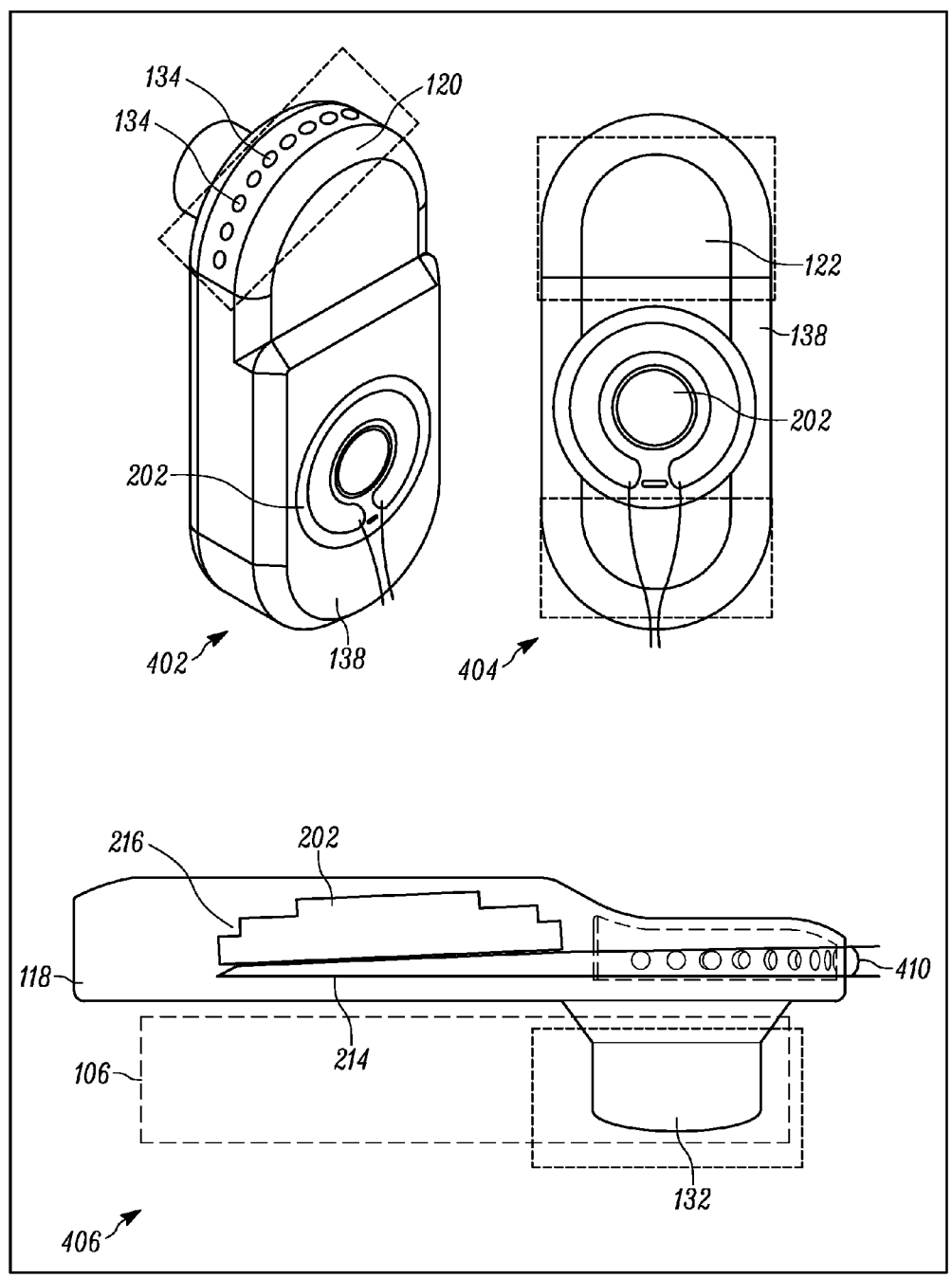
FIG. 4 shows example photographs of the loudspeaker audio accessory coupled to the portable radio in accordance with the various embodiments.

FIG. 4 shows photographic examples of the loudspeaker audio accessory 102 coupled to the portable radio 104 in accordance with the various embodiments. Translucent plastic housings were used to facilitate viewing of internal components. A plurality of views is provided comprising an isometric view 402, a back view 404 and a side view 406. Audio porting 134 is shown located at the top of the accessory housing in view 404 with the loudspeaker 202 being set down further within the housing behind the clip 138. The back view 404 shows the back of the accessory loudspeaker 202 visible through the clip 138 and back surface 122 of the accessory housing 118. The accessory loudspeaker 202 is seen in view 406 with titled angle 410 creating both front and back speaker volume areas 214, 216. Circular button 132 is shown coupled in the radio through-hole. Thus, the loudspeaker has been mounted within a limited space constraint in a non-cabled manner and oriented within with sufficient back and front volume for porting upwards to the porting 134.

Samples have been assembled and built using a loudspeaker of D28 mm×4.5 mm size being accommodated within an accessory housing of 78 mm×33 mm×15 mm size and mated through the non-cable interface to a radio of 98 mm×48 mm×13.5 mm size. The assembly provided by the various embodiments allows for the accessory loudspeaker 202 to generate both boosted audio and/or alert signals in a very small form factor. The loudspeaker acoustics have been measured and determined to provide suitable loudness and clarity similar to larger size radios, which is advantageous for usage in busy environments, for example supermarkets and shopping complexes.

Accordingly, there has been provided a loudspeaker audio accessory for a portable radio. The loudspeaker audio accessory provides enhanced audio so that a user can remotely access a loudspeaker and/or send an emergency signal and tone, such as to request help. The ability to accommodate the loudspeaker in a non-cabled accessory allows users of different sizes to easily handle and manipulate the device without the adjustment of cables or tethers.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

While the embodiments described have been applied to microcontrollers, it will be appreciated that some embodiments may alternatively be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An audio accessory, comprising:
   an accessory housing having an electro-mechanical, non-cable interface for coupling the accessory housing to a radio;
   a battery;
   an accessory loudspeaker;
   audio circuitry;
   a switch; and
   the accessory housing providing first and second modes of operation, the first mode of operation being a stand-alone mode generating an emergency alert audio tone via the accessory loudspeaker in response to the switch being enabled; and
   the second mode of operation providing boosted audio via the accessory loudspeaker when the accessory housing is coupled to the radio.

2. The audio accessory of claim 1, further comprising:
   short range communication circuitry for wirelessly communicating with the radio.

3. The audio accessory of claim 2, wherein the accessory loudspeaker provides boosted audio or emergency alerts from the accessory loudspeaker when the accessory housing is separated from the radio and communicating through a short range link.

4. The audio accessory of claim 1, further comprising:
a clip mounted to a back surface of the accessory housing.

5. The audio accessory of claim 1, wherein the accessory housing comprises front, back, top, bottom, first side, and second side surfaces, and the accessory loudspeaker is positioned at a tilted angle relative to the front surface and accessory audio porting is located along a top surface.

6. The audio accessory of claim 1, wherein the electro-mechanical, non-cable interface of the accessory housing comprises a circular button on the front surface of the accessory housing, the circular button having interface contacts disposed thereon.

7. A portable communication system, comprising:
a radio comprising:
a radio housing, the radio housing having front and back surfaces, the radio housing having a through-hole forming an inner circular wall through the front and back surfaces;
a radio speaker for generating audio through the front surface of the radio housing;
an audio accessory comprising:
an accessory housing formed of front, back, top, bottom, and first and second side surfaces, the audio accessory having an electro-mechanical button interconnect coupled to the front surface of the accessory housing for mating with a corresponding interconnect within the through-hole of the radio; and
an accessory loudspeaker contained within the accessory housing, the accessory loudspeaker being positioned at a tilted angle towards the front surface of the accessory housing; and
audio porting for the accessory loudspeaker being located on the top surface and side surfaces of the accessory housing.

8. The portable communication system of claim 7, wherein audio from both speakers is generated at the same time to generate a boosted audio mode when the audio accessory is coupled to the radio.

9. The portable communication system of claim 7, further comprising:
an emergency switch located on the accessory housing for enabling an emergency audio signal to be generated from the accessory loudspeaker when the audio accessory is disconnected from the radio.

10. The portable communication system of claim 7, further comprising:
first and second dedicated volume areas located in front and behind the tilted accessory loudspeaker.

11. The portable communication system of claim 9, further comprising:
a clip on a back surface of the accessory housing.

12. The portable communication system of claim 9, further comprising: a power source within the accessory housing.

13. The portable communication system of claim 11, wherein the clip is a user wearable clip.

14. The portable communication system of claim 11, wherein the clip mounts the audio accessory remotely from the radio, and the audio accessory and radio communicate via a short range link to provide boosted audio through both speakers.

15. The portable communication system of claim 11, wherein the clip mounts the audio accessory remotely from the radio, and the audio accessory and radio communicate via a short range link to generate an emergency audio signal through both speakers.

16. The portable communication system of claim 11, wherein an emergency switch on the accessory housing selectively initiates an emergency sequence through both the radio speaker and the accessory loudspeaker, or plays out audio over both the radio speaker and the accessory loudspeaker for a boosted effect.

* * * * *